(12) United States Patent
Abdalla et al.

(10) Patent No.: US 7,802,118 B1
(45) Date of Patent: Sep. 21, 2010

(54) FUNCTIONAL BLOCK LEVEL CLOCK-GATING WITHIN A GRAPHICS PROCESSOR

(75) Inventors: Karim M. Abdalla, Menlo Park, CA (US); Robert J. Hasslen, III, Menlo Park, CA (US)

(73) Assignee: Nvidia Corporation, Santa Clara, CA (US)

( * ) Notice: Subject to any disclaimer, the term of this patent is extended or adjusted under 35 U.S.C. 154(b) by 625 days.

(21) Appl. No.: 11/614,248

(22) Filed: Dec. 21, 2006

(51) Int. Cl.
*G06F 1/32* (2006.01)

(52) U.S. Cl. .................. 713/322; 713/300; 713/323; 713/324; 713/500

(58) Field of Classification Search .................. 713/322, 713/500
See application file for complete search history.

(56) References Cited

U.S. PATENT DOCUMENTS

| | | | |
|---|---|---|---|
| 5,392,437 A | 2/1995 | Matter et al. | |
| 5,585,745 A * | 12/1996 | Simmons et al. | 326/93 |
| 5,677,849 A | 10/1997 | Smith | |
| 5,734,808 A * | 3/1998 | Takeda | 345/419 |
| 5,768,213 A | 6/1998 | Jung et al. | |
| 5,781,783 A * | 7/1998 | Gunther et al. | 713/320 |
| 5,951,689 A | 9/1999 | Evoy et al. | |
| RE36,839 E * | 8/2000 | Simmons et al. | 326/93 |
| 6,247,134 B1 * | 6/2001 | Sproch et al. | 713/320 |
| 6,342,795 B1 | 1/2002 | Ohta | |
| 6,393,579 B1 | 5/2002 | Piazza | |
| 6,434,704 B1 | 8/2002 | Dean et al. | |
| 6,611,920 B1 * | 8/2003 | Fletcher et al. | 713/322 |
| 6,647,502 B1 | 11/2003 | Ohmori | |
| 6,820,209 B1 * | 11/2004 | Culbert et al. | 713/501 |
| 6,822,481 B1 * | 11/2004 | Srikantam et al. | 326/93 |
| 6,915,438 B2 | 7/2005 | Boros | |
| 6,938,176 B1 * | 8/2005 | Alben et al. | 713/323 |
| 6,954,210 B2 * | 10/2005 | Nishi | 345/565 |
| 6,983,389 B1 * | 1/2006 | Filippo | 713/324 |
| 7,076,681 B2 | 7/2006 | Bose et al. | |
| 7,275,168 B2 * | 9/2007 | Griffin | 713/324 |
| 7,406,588 B2 | 7/2008 | Lin et al. | |
| 2002/0083354 A1 | 6/2002 | Adachi | |
| 2003/0210247 A1 | 11/2003 | Cui et al. | |
| 2004/0123170 A1 | 6/2004 | Tschanz et al. | |
| 2006/0288241 A1 | 12/2006 | Felter et al. | |

OTHER PUBLICATIONS

Abdalla et al., U.S. Appl. No. 11/614,221, filed Dec. 21, 2006, Office Action dated Jul. 17, 2009.
Alben, U.S. Appl. No, 11/614,236, filed Dec. 21, 2006, Final Office Action dated Sep. 24, 2009.
U.S. Appl. No. 11/614,221, filed Dec. 2006, Abdalla, Karim M., et al.
U.S. Appl. No. 11/614,236, filed Dec. 2006, Alben, Jonah M.

* cited by examiner

*Primary Examiner*—Nitin C Patel
(74) *Attorney, Agent, or Firm*—Cooley LLP (57) ABSTRACT

An embodiment of the invention includes receiving an indicator of a flow of data associated with a graphics processing stage within a graphics pipeline of a graphics processor. A clock signal to a portion of the graphics processing stage is modified based on a status of the flow of data. The clock signal is received from a clock signal generator within the graphics processor.

1 Claim, 8 Drawing Sheets

FIG. 8 ary clock-gating strategy, according to an embodiment of
FUNCTIONAL BLOCK LEVEL CLOCK-GATING WITHIN A GRAPHICS PROCESSOR

RELATED APPLICATIONS

This application is related to the following commonly owned and assigned applications: application Ser. No. 11/614,221, filed on Dec. 21, 2006, now pending, and, application Ser. No. 11/614,236, filed on Dec. 21, 2006, now pending, each of which is incorporated herein by reference in its entirety.

BACKGROUND

The disclosed invention relates generally to clock-gating in an electronic chip, and in particular, to functional block level clock-gating.

Managing power consumption within an electronic chip has historically been and continues to be a major factor driving the design of chips within the semiconductor industry. As the number of transistors within chips (e.g., microprocessor, graphics chips) has increased, the need to reduce on-chip power consumption has increased and has become more difficult to achieve. The power consumption dilemma is further exacerbated by the increasing use of large, complex chip designs in mobile devices where low-power consumption is critical.

Power saving techniques, such as deactivating or slowing-down a clock signal to a large zone of a chip for the entire time that the chip is in a power savings mode, can be used to meet the low power consumption specifications of some chip designs. These known clock signal power saving techniques, however, have several drawbacks. For example, the latency to slow-down, turn-off, and/or turn-on a clock signal to a fixed zone when entering or exiting a power savings mode within a chip can be prohibitively long (e.g., hundreds of clock cycles) and can substantially disrupt data processing by the chip. Accordingly, a need exists for methods and apparatus for clock-gating within an electronic chip.

SUMMARY OF THE INVENTION

An embodiment of the invention includes receiving an indicator of a flow of data associated with a graphics processing stage within a graphics pipeline of a graphics processor. A clock signal to a portion of the graphics processing stage is modified based on a status of the flow of data. The clock signal is received from a clock signal generator within the graphics processor.

BRIEF DESCRIPTION OF THE DRAWINGS

The present invention is described with reference to the accompanying drawings. In the drawings, identical or like reference numbers indicate identical or functionally similar elements.

FIG. 2B illustrates the processing of data and status of the functional blocks within the pipeline of the electronic chip shown in FIG. 1 at a third time, according to an embodiment of the invention.

DETAILED DESCRIPTION

Clock-gating at a functional block level can be implemented to reduce the overall power consumption of an electronic chip by temporarily disabling (e.g., blocking, turning-off, deactivating) and/or enabling (e.g., unblocking, turning-on, reactivating) a clock signal to a functional block level circuit component within the electronic chip using a clock gate. The functional block level circuit component/unit can be, for example, a functional block, a portion of a functional block and/or an interface circuit between functional blocks in, for example, a data processing pipeline. In some embodiments, the clock signal to a functional block level circuit component can be temporarily disabled, for example, for even just a few clock cycles.

Figure 1:
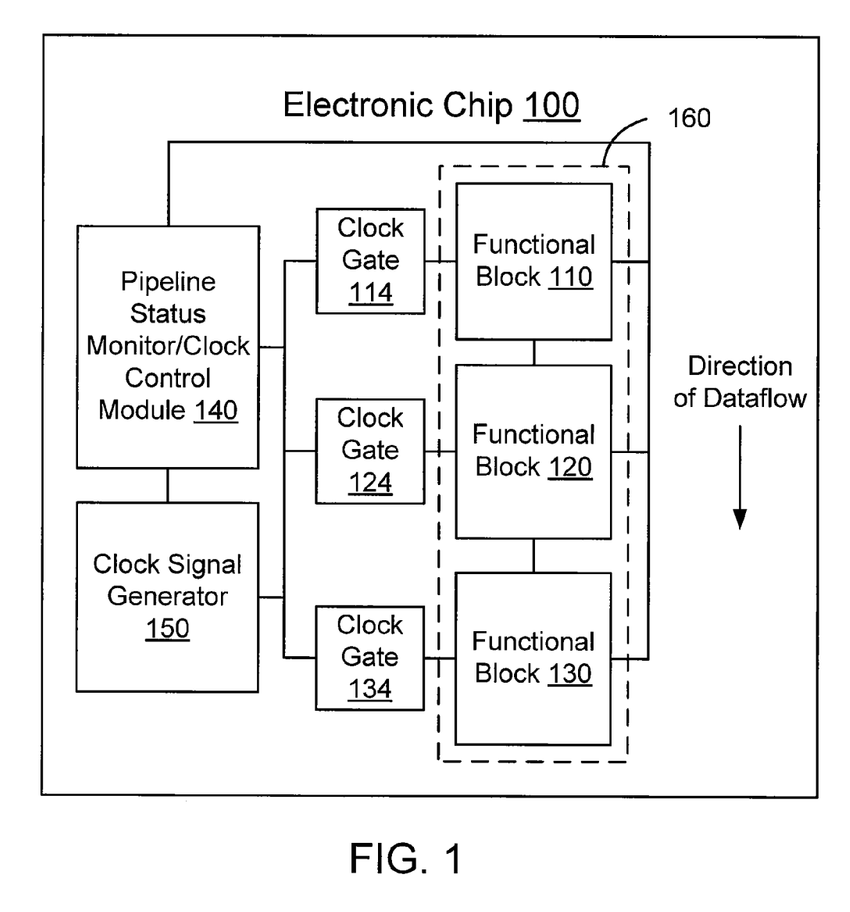
FIG. 1 is a schematic diagram of an electronic chip configured with a functional block level clock-gating, according to an embodiment of the invention.

FIG. 1 is a schematic diagram of an electronic chip 100 configured with a functional block level clock-gating strategy in a data processing pipeline 160, according to an embodiment of the invention. The electronic chip 100 can, for example, be a microprocessor, a graphics processor, a mobile processor, an application specific integrated circuit (ASIC), a field programmable gate array (FPGA), etc. Functional blocks 110, 120 and 130 define the data processing pipeline 160 (also referred to as a pipeline) with data flowing through the pipeline 160 in a downward direction as shown in FIG. 1. For example, functional block 110 is configured to process data and send the processed data to functional block 120 for further processing.

Each of the functional blocks 110, 120, and 130 within the pipeline 160 include circuitry configured to process data such as any combination of, for example, arithmetic logic units (ALU), registers, decoders/encoders, floating point units (FPU), coprocessors, busses, and/or instruction units. In some embodiments, the core processing portion of any of the functional blocks 110, 120, and 130, can be comprised of parallel processing sub-units or circuits. Although not shown, the pipeline 160 can also be configured to include interface circuits such as, for example, a standard bus interface, such as a pipebus, or a first-in-first-out (fifo) based interface. The interface circuits can be configured to facilitate the transporting of data between functional blocks 110, 120 and 130 and/or other interface circuits (not shown) within the pipeline 160.

The functional blocks 110, 120, and 130 are configured to process data and synchronize the flow of data through the pipeline 160 based on a clock signal (e.g., symmetrical square wave) from a clock signal generator 150 received via clock gates 114, 124, and 134, respectively. The clock gates 114, 124, and 134 can be, for example, clock macros that include, clock dividers, clock source selection muxes, clock trimmers and shapers (fine delay and pulse width control, and clock gating elements.

Figure 2A:
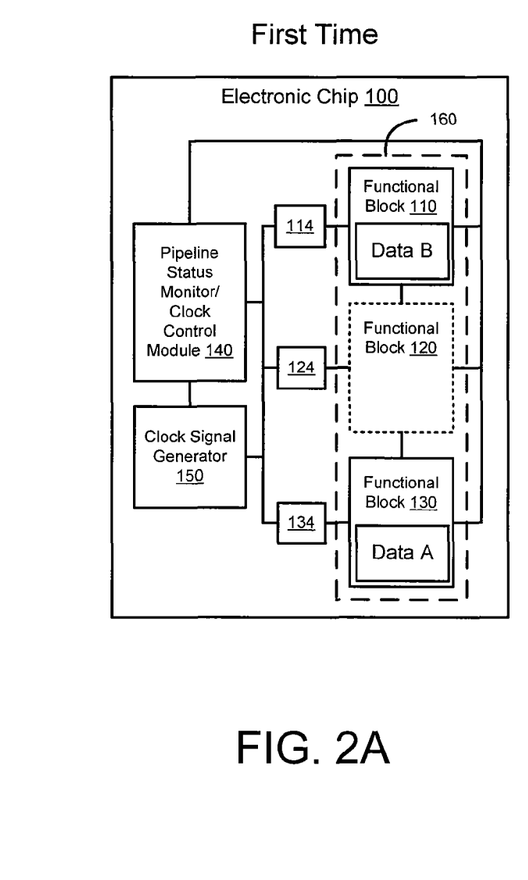
FIG. 2A illustrates the processing of data and status of the functional blocks within the pipeline of the electronic chip shown in FIG. 1 at a first time, according to an embodiment of the invention.
Figure 2B:
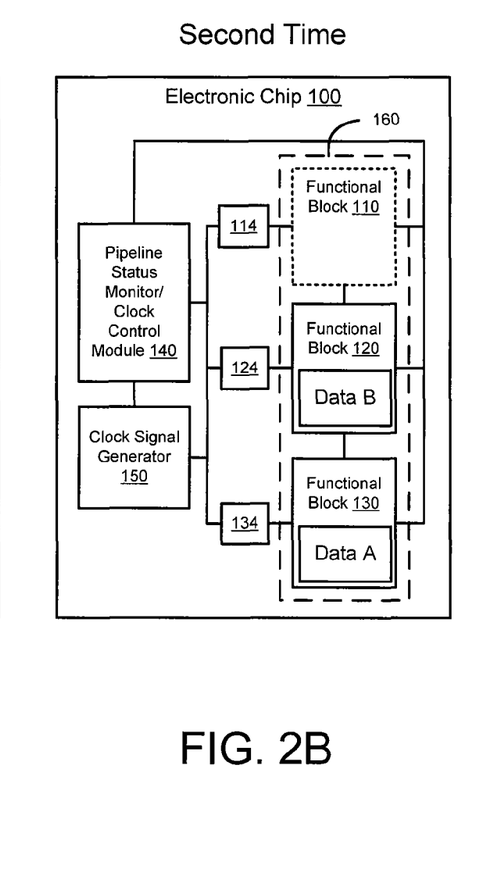
FIG. 2B illustrates the processing of data and status of the functional blocks within the pipeline of the electronic chip shown in FIG. 1 at a second time, according to an embodiment of the invention.
Figure 2C:
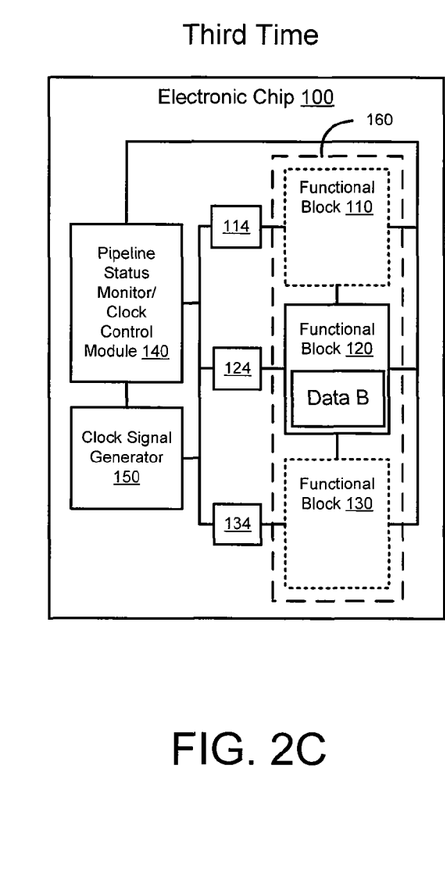

The electronic chip 100 includes a pipeline status monitor/clock control module 140 (also referred to as a pipeline module) that is configured to monitor, detect, and/or determine the status (e.g., idle status) of at least one of the functional blocks 110, 120, or 130. The status is indicative of data-flow within the pipeline 160. In some embodiments, two or more functional blocks may be monitored by, for example, a pipeline module 140 (e.g., by monitoring the activity of a circuit component and an adjacent circuit component within the pipeline 160). The status can also be referred to as a state (e.g., inactive state or active state). The pipeline module 140 is configured to independently control, based on the status and data-flow, the clock signal to the functional blocks 110, 120, and 130 using the clock gates 114, 124, and 134, respectively. An example of the disabling/enabling of clock signals based on status/data-flow using the pipeline module 140 is illustrated in FIGS. 2A through 2C. Specifically, FIGS. 2A through 2C show that a functional block level clock-gating strategy can trigger automatic staggering of the clock signal to each of the functional blocks 110, 120, and 130 as they individually change from an active status to an inactive status (e.g., idle), and vice versa, as data flows through the pipeline 160.

Referring back to FIG. 1, the pipeline module 140 can be configured to include various functional block level clock-gating functionality that can be separated into one or more hardware and/or software modules that can be distributed and/or associated with any portion of the pipeline 160. For example, the pipeline module 140 can be configured in some functional block level clock-gating strategies to filter out status reporting glitches (e.g., an inaccurate or incomplete status report), stall interface circuits when the clock signal is disabled or being enabled, trigger the enabling of clock signal based on a wake-up event, and/or trigger the enabling of a clock signal immediately (e.g., next clock pulse) for non-stallable interfaces for one or more portions of the pipeline 160. When enabling a clock signal to a circuit component within the pipeline 160, in some embodiments, the pipeline module 140, for example, can be configured to immediately enable or delay the enabling of the clock signal and/or delay data processing until the clock signal is stable (e.g., necessitated due to clock signal insertion delay and status reporting latency). In some embodiments, hardware and/or software modules, for example, in a pipeline module 140 can be configured to delay the enabling of a clock signal to a functional block to allow sequencing of multiple clocks distributed across a chip to reduce large chip-wide current changes over period of short periods of time (di/dt) when multiple clock signals are simultaneously triggered by, for example, a host processor.

In some embodiments, the hardware and/or software used to implement a functional block level clock gating strategy (e.g., pipeline module 140) can be configured to reduce the effective clock frequency to a functional block level circuit component by suppressing clock signal pulses (e.g., for a few clock signal pulses from a group of clock signal pulses) based on a software programmed value and/or a hardware activity-level for any portion of a pipeline that is partitioned using clock gates. Reducing (and/or increasing) the number of clock cycles of a clock signal based on the activity-level of the circuit component can be referred to as clock signal throttling or throttling. In some clock throttling scenarios, the hardware activity-level is in a semi-active or partially active state where only a fraction of the processing capability of the functional block is being used. The functional block level clock-gating functions/features briefly mentioned above are described in more detail below.

FIGS. 2A through 2C illustrate the enabling/disabling of the clock signal to the circuit components within the pipeline 160 of electronic chip 100 (shown in FIG. 1) as data is processed through the pipeline 160 over a period of time, according to an embodiment of the invention. Because processing data through any portion of the pipeline 160 (e.g., functional block 120) can require just a few or hundreds of clock cycles, the functional block level clock-gating strategy can be used to flexibly disable the clock signal to portions of the pipeline 160 while that portion is waiting for upstream and/or downstream circuit components to finish processing.

FIG. 2A shows that at a first time, functional blocks 130 and 110 are actively processing Data A and Data B, respectively, and the clock signals to these functional blocks are enabled by the pipeline module 140 based on their active status. The pipeline module 140, however, is disabling the clock signal to functional block 120 using clock gate 124 because functional block 110 is not sending data to functional block 120 (i.e., idle status) and is not receiving valid data (i.e., no data-flow). The idle state of the functional block 120 is illustrated by the phantom lines. Note that when any one of the functional blocks 110, 120, and 130 is not receiving a clock signal, the functional block cannot send, receive, and/or process data.

As shown in FIG. 2B, the clock signal to functional block 120 is activated/enabled so that functional block 120 can process Data B at a second time (after the first time) in an active state (e.g., information processing mode) when Data B is transmitted from functional block 110 to functional block 120. Accordingly, the clock signal to functional block 110 is disabled by the pipeline module 140 at time B using clock gate 114 because functional block 110 has changed to an idle state. Finally, at third time (after the second time) as shown in FIG. 2C, the clock signal to functional block 130 is disabled as functional block 130 changes to an idle state because it is no longer processing Data A and will not be receiving valid data from functional block 120.

In some embodiments, the clock signals to functional blocks 110, 120 and 130 can be disabled for asynchronous or synchronous overlapping periods of time. By using clock gates 114, 124, and 134, the clock signal to an individual circuit component within the pipeline 160 can be disabled without disrupting (e.g., shutting down) the operation of the clock signal generator 150. The disabling/enabling of the clock signal using the clock gates 114, 124, and/or 134 can be triggered when a threshold condition based on a status or activity-level measurement (e.g., percentage usage value) of one or more of the functional blocks 110, 120 and/or 130 is satisfied as determined by, for example, the pipeline module 140. Also, in some embodiments, the clock signal to the circuit components within the pipeline 160 can be controlled based on a variety of states (e.g., stalled state, quiescent state, etc) rather than based on only an active or inactive state.

This functional block level clock-gating strategy can help to reduce di/dt and/or latency issues that can be caused by disabling and enabling large zones of the clock signal, for example, by turning on and off the clock signal generator 150. Also, control of the clock signal coordinated based on data-flow can reduce the risk of data loss and/or decrease processing inefficiencies while still increasing the amount of time that the clock signal is disabled to the functional blocks 110, 120, and 130 to save power.

Also, functional block level clock-gating can be implemented in some electronic chips where functional block level circuit components (e.g., functional blocks or interface circuits) are not in a pipelined configuration. In some embodiments, clock gate 114, for example, can be used to disable/enable a clock signal to an interface circuit (not shown) rather than, for example, functional block 110. The functional block level clock-gating strategy can be modified, in some embodiments, to temporarily enable a clock signal to functional level blocks (e.g., interface circuits) that are normally off. In some embodiments, the clock signal generator 150 can be a phase-lock loop (PLL) that can be configured to receive, for example, a reference clock signal (not shown) and then redistribute the clock signal to the functional level blocks.

Figure 3:
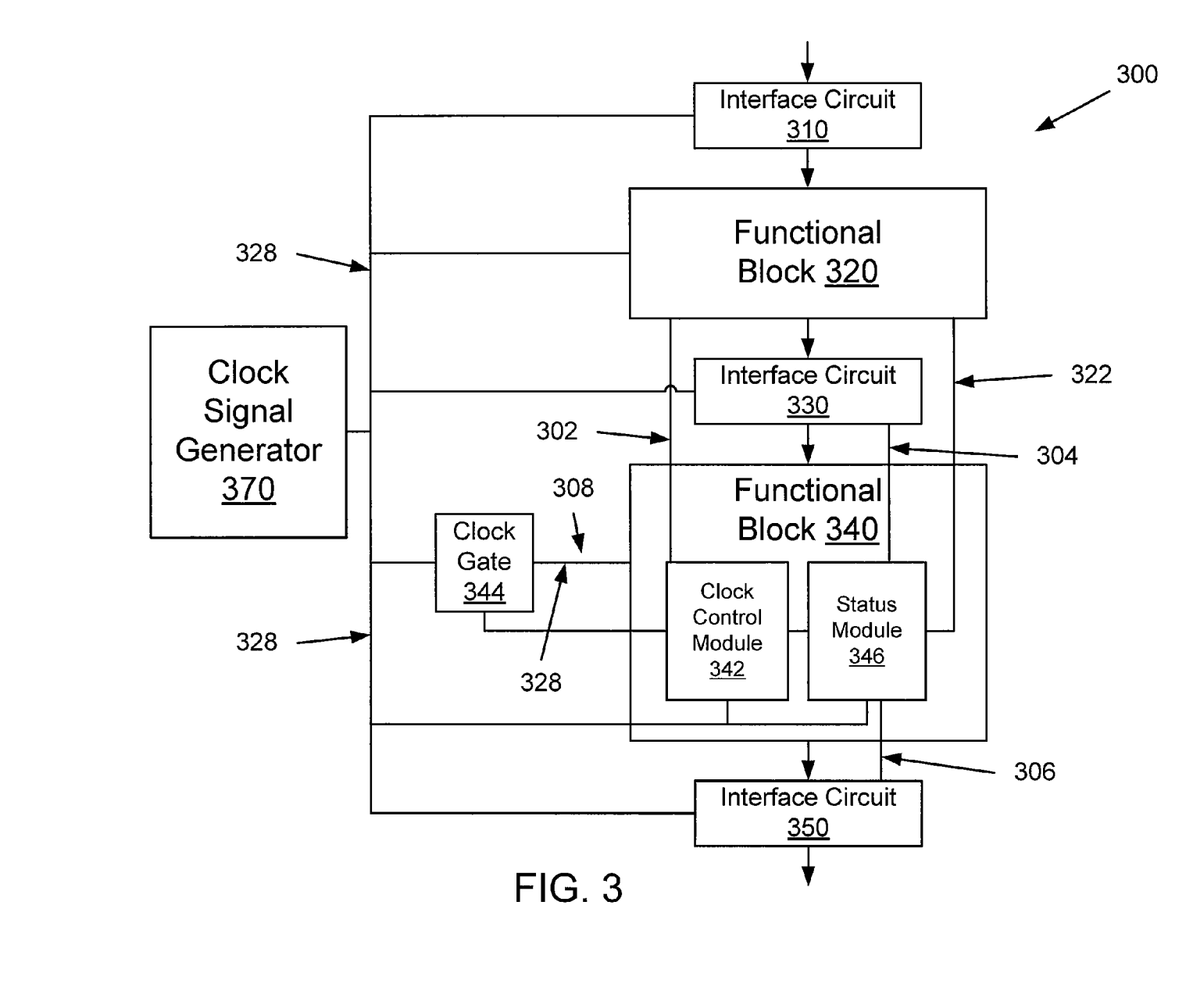
FIG. 3 is a schematic diagram of a functional block with a clock gate that is controlled based on the status of data-flow within a data processing pipeline of an electronic chip, according to an embodiment of the invention.

FIG. 3 is a schematic diagram of a functional block 340 with a clock gate 344 that is controlled based on the status of data-flow within a data processing pipeline 300 of an electronic chip, according to an embodiment of the invention. A clock signal 328 to the functional block 340 is disabled/enabled using the clock gate 344 based not only on the status of and/or flow of data within the functional block 340, but also based on the flow of data to/from other circuit components (e.g., from another functional block or interface circuit) within the pipeline 300. The clock signal 328 is generated by a signal clock generator 370 and can be used to synchronize the circuit components (e.g., functional block 340) in the pipeline 300.

The pipeline 300, in this embodiment, includes interface circuits 310, 330 and 350 and functional blocks 320 and 340. The interface circuits 310, 330, and 350 are circuit components that facilitate transporting data between functional blocks such as functional blocks 320 and 340, or other interface circuits (not shown).

Data-flows through the pipeline 300 as indicated by arrows between the circuit components of the pipeline 300. The pipeline 300 shows that data can be received at interface circuit 310 from, for example, an input/output (I/O) port (not shown), interface circuit (not shown) or functional block (not shown) and transmitted from interface circuit 310 to functional block 320 where the data can be processed and/or modified. Functional block 320 transmits the processed/modified data via interface circuit 330 to functional block 340. Functional block 340 processes and/or modifies the data before transmitting the data to interface circuit 350. The data can be transmitted via interface 350 to another interface circuit (not shown), I/O port (not shown), or functional block (not shown).

In this embodiment, the clock signal 328 to the functional block 340 is disabled (e.g., blocked) using a clock gate 344 when the functional block 340 is one of three inactive states— an idle state, a quiescent state, or a stalled state. When the functional block 340 returns to an active state, will send data, and/or receive data, the clock signal 328 is enabled (e.g., unblocked) by the clock gate 344 so that the functional block 340 can be ready to (or continue to) process data based on the clock signal 328. The status module 346 can be configured, in some embodiments, to detect different inactive and/or active states than those enumerated above. In some embodiments, the status module 346 can be configured to detect, for example, a halted state and disable the clock signal 328 based on this state. The halted state is a state where the entire pipeline 300 can be disabled for a period of time.

The functional block 340 can be considered idle (e.g., in an idle state) when the functional block 340 is not processing data and the status of data-flow from upstream and/or downstream circuit components within the pipeline 300 is not known. The functional block 340 can be identified as quiescent (e.g., in a quiescent state) when the functional block 340 is idle and is waiting to receive data from an upstream component. In this embodiment, the functional block 340 can wait for data from functional block 320 (to be received via interface circuit 330) when in the quiescent state. The functional block 340 can be identified as stalled (e.g., in a stalled state) when the functional block 340 is idle because the functional block is waiting to send data to a downstream component circuit (e.g., another functional block) via interface circuit 350. In this embodiment, the functional block 340 can hold a result and/or partially calculated value(s) when in the stalled state. The status of functional block 340 can also be a collective indicator based on the status of one or more portions of the functional block 340.

The portion of the clock signal 328 that is controlled by the clock gate 344 can be referred to as a gated clock signal 308. A portion of the clock signal 328 that is not controlled by a clock gate (e.g., clock gate 344) can be referred to as an ungated clock signal. In this embodiment, the only circuit component of the pipeline 300 that is connected to the gated clock signal 308 is functional block 340. The other circuit components can be connected to the clock signal 328 without a clock gate (can be referred to an ungated clock signal).

The gated clock signal 308 is controlled using a clock control module 342 and a status module 346 that are both included in the functional block 340. For example, the status module 346 can send a clock-control signal to the clock control module 342 based on the status/flow of data associated with the functional block 340 to trigger the clock control module 342 to disable/enable the gated clock signal 308 to the functional block 340 using the clock gate 344. The clock-control signal can also be a clock-control indicator or clock-control instruction.

The status module 346 is configured to determine the status of and/or flow of data associated with the functional block 340 within the pipeline 300 by monitoring not only the functional block 340, but also other circuit components within the pipeline 300. For example, the status module 346 can be configured to determine that the state of the functional block 340 is a quiescent state when the functional block 340 is idle and when the interface circuit 330 is also idle. An idle interface circuit 330 indicates that functional block 320 is not currently sending data. The status module 346 can be configured to identify the states of the interface circuit 330 and functional block 340 as idle when the status module 346 determines that the activity-level of the interface circuit 330 and the functional block 340 are zero or substantially zero (e.g., is not processing important data). The status module 346 can determine/receive the status of interface circuit 330 via signal wire/bus 304. The status signal from the interface circuit 330 can be a flow control signal associated with the control of data flow through the pipeline 300.

As another example, the status module 346 can be configured to determine that the state of the functional block 340 is a stalled state when the functional block 340 is idle (and holding a value/result) and when the interface circuit 350 is busy. An idle interface circuit 350 indicates that the interface circuit is not currently ready to receive data. The status module 346 can be configured to identify the status of the interface circuit 350 as active when the status module 346 determines that the activity-level of the interface circuit 350 is greater than zero or substantially greater than zero. The status module 346 can determine/receive the status of interface circuit 350 via signal wire/bus 306. The status signal from the interface circuit 350 can be a flow control signal associated with the control of data flow through the pipeline 300.

In some embodiments, the status module 346 can be connected with any of the circuit components within the pipeline 300 such as the functional block 320, interface circuit 330 and/or interface circuit 350 to monitor/determine the status (or activity-level) of any of the circuit components and/or receive an indicator of the status of any of the circuit components. In some embodiments, the status (e.g., idle status, active status) can be determined based on an activity-level indicator that indicates the activity-level (e.g., 80% busy) of, for example, a functional block or circuit interface. The status module 346 can be configured, in some embodiments, to determine status continuously, at specified intervals and/or at random intervals. In some embodiments, the status of data-flow within the pipeline 300 can be received and/or considered only if it is determined that the status of the functional block is an inactive status to avoid unnecessarily determining and/or processing the status of the data-flow.

In some embodiments, a circuit component within the pipeline 300 (e.g., the interface circuit 330 and/or functional block 320) can include a separate status module (not shown) that sends an indicator of the status of the circuit component to status module 346. The separate status module can be configured to periodically and/or randomly send the status of the circuit component to the status module 346. In some embodiments, the status module 346 can be configured to receive the status of the circuit component within the pipeline 300 only when the status module 346 requests the status of the circuit component from, for example, a separate status module (not shown).

After the status module 346 determines whether to enable/disable the clock signal 328 to the functional block 340, the status module 346 can produce and send a clock-control signal to the clock control module 342. The clock control module 342 can be configured to disable/enable the gated clock signal 308 to the functional block 340 using the clock gate 344 based on the clock-control module. For example, the clock control module 342 can trigger the clock gate 344 to close in response to a clock-control signal generated by the status module 346 when the functional block 340 and the interface circuit 330 are in an inactive state. In some embodiments, the status module 346 can be configured to report the status to the clock control module 342 and the clock control module 342 can determine whether to enable/disable the clock signal 328.

The status module 346 and clock control module 342 are connected to the clock signal 328 without gates (ungated clock signal) so that they can continue to detect the status of the functional block 340 and control the clock gate 344, respectively, even when the clock signal 328 to the functional block 340 has been disabled. The functional block 340 will not be in a fully operational state when the clock signal 328 has been disabled.

The clock control module 342 can also be configured to receive a wake-up signal via signal wire/bus 302 from, for example, functional block 320 that can be used to trigger reactivation of the functional block 340. The wake-up signal can also be a wake-up indicator or a wake-up instruction. The wake-up signal can trigger the clock gate 344 to enable the clock signal 328 to the functional block 340 to change the functional block 340 from an inactive state with a disabled clock signal to an active state with an enabled clock signal. The wake-up signal can be a signal sent from, for example, functional block 320 indicating that functional block 320 is ready to send data. In some embodiments, the wake-up signal 302 can be sent to wake-up the functional block 340 (e.g., enable the clock signal 328) one or more clock cycles before the functional block 340 is to receive data.

In some embodiments, the wake-up signal can be generated in response to a change in the activity-level of a downstream circuit component such as interface circuit 350. In some embodiments, the wake-up signal 302 can be sent to wake-up the functional block 340 (e.g., enable the clock signal 328) even one clock cycle before the functional block 340 is to send data via interface circuit 350.

As shown in FIG. 3, the wake-up signal can be received at the clock control module 342 and the clock control module 342 can use the wake-up signal to trigger the clock gate 344 to enable the clock signal 328. In some embodiments, the status module 346 can be configured to receive the wake-up signal and can be configured to trigger the enabling of the clock signal 328 via the clock control module 342.

In some embodiments, a circuit component, such as functional block 340, can require several clock cycles to return to a fully active state or stable processing state. This time period can be referred to as a wake-up time period. The circuit components within the pipeline 300 can be configured to send an early wake-up signal to the functional block 340 that anticipates the wake-up time period. For example, the early wake-up signal can be sent at a first time such that the functional block 340 will be ready to receive or send data immediately after the wake-up time period has passed at a second (and later) time. For example, if the wake-up time period for functional block 340 is 3 clock cycles, functional block 320 can be configured to send an early wake-up signal to the clock control module 342 of functional block 340 at least 3 clock cycles before the data will be sent from functional block 320 so that functional block 340 can have time to, for example, attain full functionality. In some embodiments, the wake-up time period can be an arbitrary number of clock cycles set to anticipate possible wake-up glitches.

In some embodiments, the status module 346 can be configured to generate a wake-up signal in response to detecting a change in activity-level in the interface circuit 330 and/or functional block 320. The status module 346, in some embodiments, can be configured to actively query downstream and/or upstream circuit components in the pipeline 300 to determine whether to generate a wake-up signal. For example, the status 346 can be configured to determine whether or not functional block 320 is ready to send data and can wake-up functional block 340 using a wake-up signal, if necessary. The downstream circuit components and upstream circuit components can be referred to as downstream units and upstream units, respectively.

The functional block 340 can also be configured to respond to a pulse wake-up signal (also can be referred to as a pulse wake-up query). A pulse wake-up signal can be configured to cause the functional block 340 to wake-up for a short period of time (e.g., one clock cycle, a few clock cycles) so that it can be determined whether the functional block 340 is ready to send and/or receive data. For example, an upstream unit of the pipeline 300 can send a pulse wake-up signal to functional block 340 so that the upstream unit can ascertain whether or not functional block 340 is ready to receive data. Functional block 340 can wake-up for a short period of time in response to the wake-up signal so that the status module 346 can determine whether functional block 340 is ready to receive data. If the status module 346 determines that functional block 340 is not ready to receive data because, for example, functional block 340 is in a stalled state, the status module 346 can respond to the pulse wake-up signal sent by the upstream unit by indicating to the upstream unit that functional block 340 is not yet ready to receive data. The upstream unit can be configured to receive the response and wait for a period of time before sending data to functional block 340. The functional block 340 can send a signal to an upstream unit in the pipeline 300, after a pulse wake-up signal, to indicate that the functional block 340 is ready to receive data. In some embodiments, the upstream unit can be configured to send a pulse wake-up signal(s) periodically until functional block 340 is ready.

The functional block 340 can be configured to wake-up, in response to a pulse wake-up signal, for a period of time specified by the status module 346 or the functional block 340. The period of time can be defined such that the status module 346, for example, has sufficient time to determine/verify the state of the functional block 340. The status module 346 and/or the functional block 340 can be configured to respond to the pulse wake-up signal. In some embodiments, the functional block 340 can be configured to wake-up, in response to a pulse wake-up signal, for a period of time that is specified in the pulse wake-up signal (e.g., pulse wake-up instruction).

In some embodiments, functional block 340, for example, can respond to an early wake-up signal or a typical wake-up signal in a pulsed fashion (e.g., wake-up for only one or several clock cycles). For example, an upstream unit of the pipeline 300 can send a wake-up signal to functional block 340 because the upstream unit is ready to send data to functional block 340. Functional block 340 can wake-up (e.g., enable clock signal) in response to the wake-up signal. If, for example, the status module 346 determines that functional block 340 is not ready to receive data because, for example, functional block 340 is in an inactive state (e.g., stalled state), the status module 346 can respond to the wake-up signal sent by the upstream unit by indicating that functional block 340 is not yet ready to receive data and can return to an inactive state with a disabled clock signal.

Although in this embodiment, the functional block 340 is the only circuit component within the pipeline 300 that has a clock signal 328 controlled by a clock gate 344 (i.e., gated clock signal 308), in some embodiments, the clock signal 328 to one or more of the circuit components within the pipeline, such as interface circuit 330 and/or functional block 320 can be controlled independently using a clock-gating strategy.

In some embodiments, the clock control module 342 and the status module 346 can be modules that are disposed outside of the functional block 340. In some embodiments, the functionality of the clock control module 342 and the functionality of the status control module 346 can be integrated into a single module (not shown). In some embodiments, the clock control module 342 and the status module 346 can be configured to monitor the status of and/or control the clock gates associated with more than one functional block.

The status module 346 can also be configured to notify other circuit components within the pipeline 300 such as functional block 320 when the clock signal 328 to functional block 340 has been enabled and/or disabled. The notification that the clock signal 328 has been disabled and the notification that the clock signal 328 has been enabled can be referred to as a clock-disabled signal and a clock-enabled signal, respectively. The clock-disabled signal, can be sent to functional block 320 so that functional block 320, for example, can be aware that data should not be sent to functional block 340 while functional block 340 is not in an active state. The clock-disabled signal can prevent data from being sent by stalling interface circuit 320. The status module 346 can send the clock-disabled and/or clock-enabled signals to functional block 320 via, for example, wire/bus 322. In some embodiments, the clock-disabled and/or clock-enabled signals can be sent to any combination of the circuit components within the pipeline 300.

In some embodiments, the clock-enabled and/or clock-disabled signal can be used by another circuit component, such as functional block 320, to determine whether the clock signal 328 to the circuit component (itself) can be disabled. For example, if a downstream circuit component such as interface circuit 350 receives a clock-enabled signal (not shown) from functional block 340 indicating that the clock signal 328 to functional block 340 is enabled, the interface circuit 350 can be configured to ensure (based on the clock-enabled signal from functional block 340) that its own clock signal is enabled so that it can be prepared to receive data from functional block 340. In some embodiments, when the functional block 340 changes from an inactive state to an active state and sends a clock-enabled signal to another circuit component within the pipeline 300, the clock-enabled signal can be used by the other circuit component as a wake-up signal.

In sum, the functional block level clock-gating strategy described in connection with FIG. 3 enables the work-flow (e.g., data-flow) through the pipeline 300 to be monitored (e.g., by the status module 346), and the clock signal to portions of the chip turned-off (e.g., by the clock control module 342) based on the work-flow without significantly affecting the processing rate or performance of the pipeline 300. A selected subset of circuit components (i.e., functional blocks) or portions of circuit components within the pipeline 300 are turned-off for selected numbers of clock cycles as idle time periods flow through the pipeline 300. Stated differently, the portion of the pipeline that requires conventional clocking receives a master clock signal, however, portions of the pipeline that cannot perform productive work are selectively turned off when they are not capable of performing productive work. In some implementations, portions of the pipeline that can have their effective clock frequency reduced are throttled when such throttling would not significantly diminish the ability of the pipeline to perform useful work.

The power-savings strategies described above are effective at reducing power consumption because the monitoring (e.g., using the status module) and disabling/enabling of the circuit components (e.g., using the clock gate 344) within the pipeline 300 can be essentially instantaneous compared with, for example, the time necessary to process a set of instruction or data within a discrete functional block within the pipeline (e.g., zero or more clock cycles). Selective portions of the chip (e.g., functional blocks) can be turned on/off and/or throttled on/off rapidly enough, relative to processing times, that power savings may be achieved without significantly affecting processing performed by the pipeline. The clock signal 328 to the circuit components within the pipeline 300 can be turned-off for even very short non-productive time periods of the circuit components without affecting the work flow.

Figure 4:
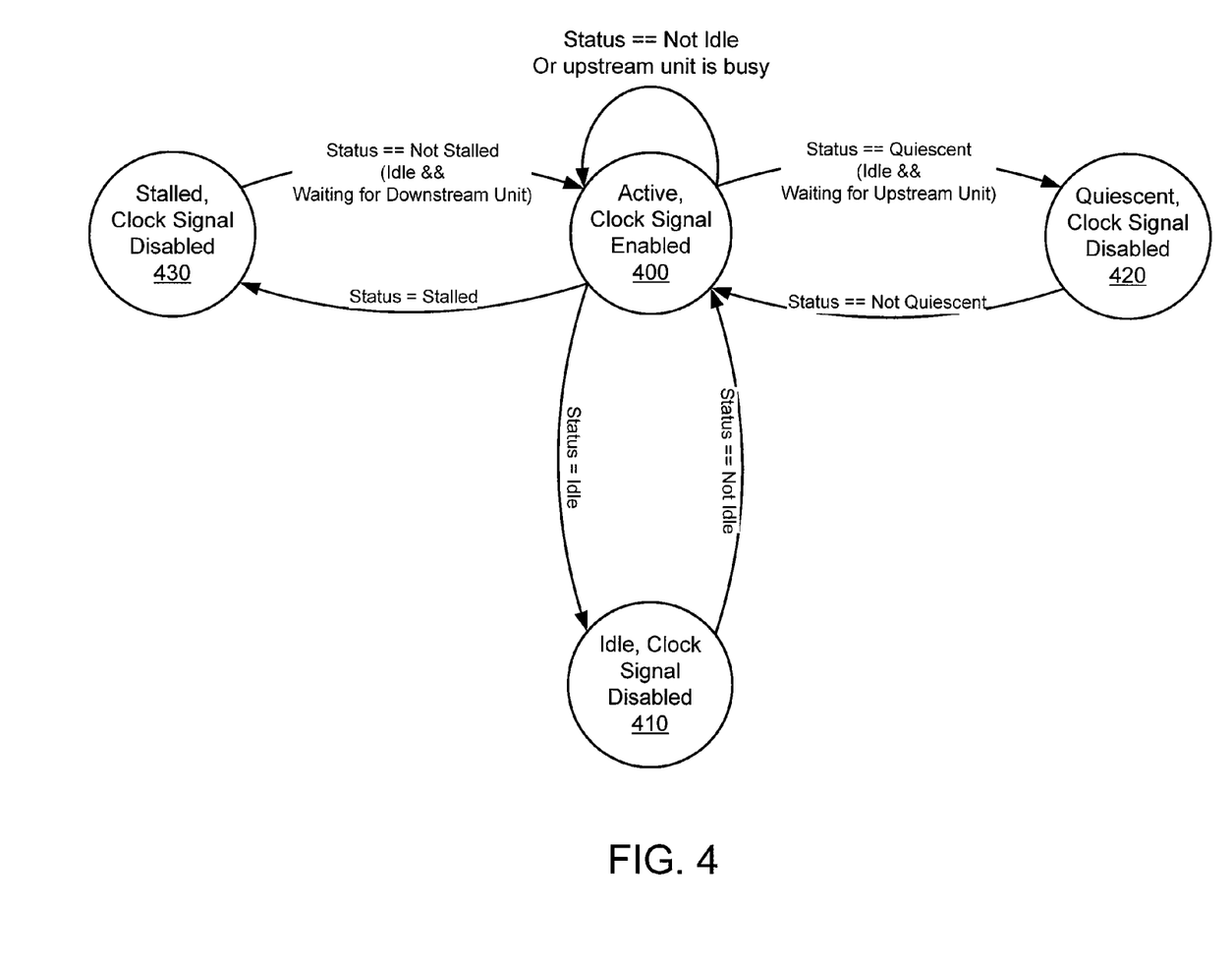
FIG. 4 is a state diagram that illustrates the states and corresponding clock signal states for a circuit component configured with a clock signal controlled based on an exemplary clock-gating strategy, according to an embodiment of the invention.

FIG. 4 is a state diagram that illustrates the states (e.g., status) and corresponding clock signal states for a circuit component configured with a clock signal controlled based on an example clock-gating strategy, according to an embodiment of the invention. The state of the circuit component, in this embodiment, can be determined based on the activity-level of the circuit component and/or based on an adjacent circuit component included in a data-flow pipeline. This state diagram illustrates four states—an idle state, a quiescent state, a stalled state, and an active state.

The state diagram shows that when the state of the circuit component is an active state (also can be referred to as a run state), the clock signal can also be enabled at 400. The circuit component remains in the active state as long as the status of the circuit component is not idle. The circuit component is not idle when the circuit component is processing data, is receiving data, and/or is sending data. In some embodiments, the circuit component is considered not idle when the circuit component is ready to process, ready to send, or ready to receive data within, for example, a few clock cycles.

The state diagram shows that when the activity-level of the circuit component changes such that the state of the circuit component is idle, the clock signal to the circuit component can be disabled and the circuit component can change to an idle state at 410. The circuit component is in an idle state when the activity-level of the circuit component is zero or substantially zero and information about the activity-level of other circuit components (e.g., downstream circuit components or upstream circuit components) is not known. When the circuit component is no longer idle or is ready to transition out of an idle state into an active state, the clock signal is enabled and the circuit component returns to an active state at 400.

When the circuit component is idle and is waiting to receive data from an upstream unit (e.g., upstream functional block) the circuit component can be changed to a quiescent state and the clock signal can be disabled at 420. When the circuit component is no longer idle and/or the upstream unit sends (or is ready to send) data to the circuit component, the clock signal to the circuit component can be enabled and the circuit component can change to the active state at 400.

When the circuit component is idle and is waiting to send to a downstream unit (e.g., downstream functional block) the circuit component the clock signal can be disabled and the circuit component can be changed to a stalled state at 430. When the circuit component is no longer idle and/or the downstream unit is ready to receive data from the circuit component, the clock signal to the circuit component can be enabled and the circuit component can change to the active state at 400.

In some embodiments, when the circuit component is in the idle state at 410 and it is later determined that the circuit component is in the idle state because the circuit component is waiting to receive data from an upstream unit, the circuit component can change to the quiescent state at 420. Likewise, when the circuit component is in the idle state at 410 and it is later determined that the circuit component is in the idle state because the circuit component is waiting to send to a downstream unit, the circuit component can change to the stalled state at 430.

In some embodiments, a circuit component can be configured so that a clock signal to the circuit component can be disabled based on a detection of a variety of inactive states. For example, a circuit component can be configured to have a clock signal that is only disabled when the circuit component is quiescent and/or stalled. In some embodiments, a circuit component can be configured so that a clock signal to the circuit component is only disabled when the circuit component, the upstream unit, and the downstream unit are idle.

Figure 5:
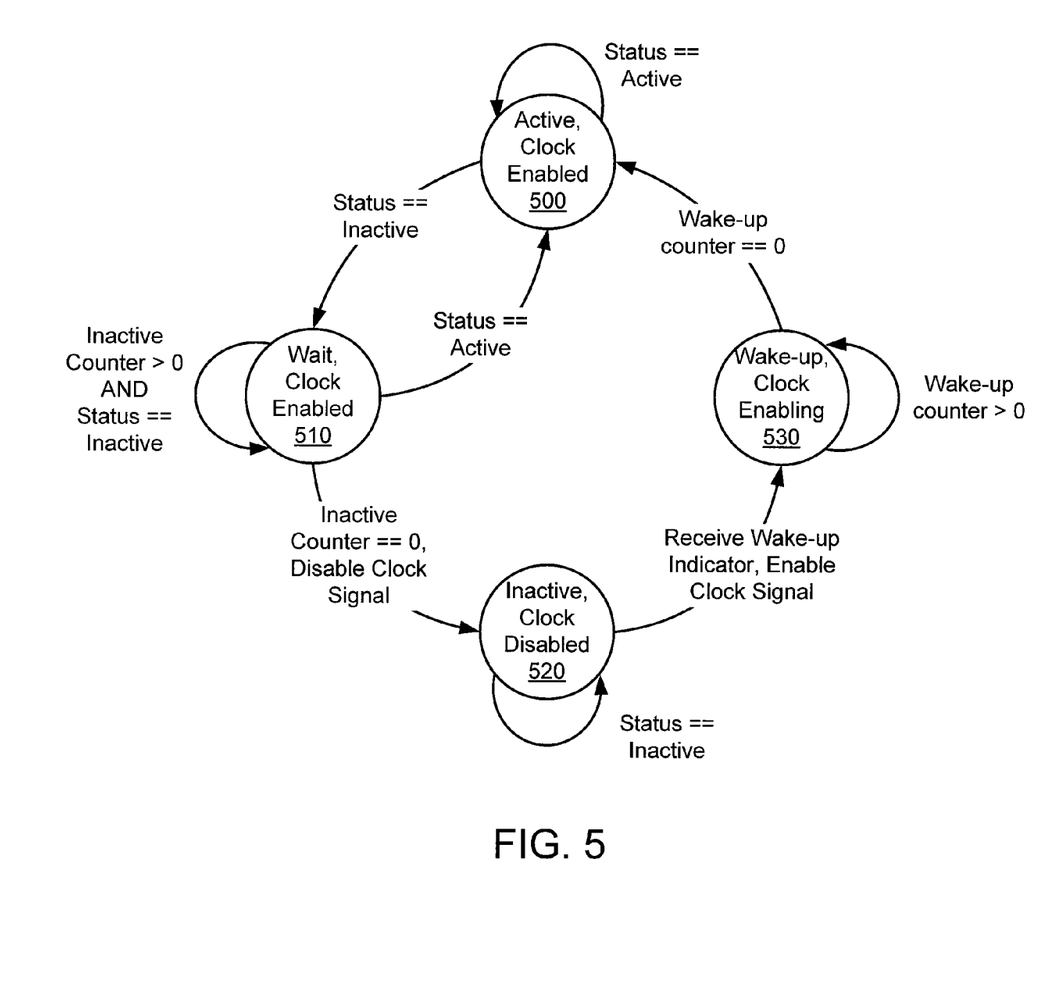
FIG. 5 is an example of a state diagram that illustrates events that are triggered and/or occur when a circuit component transitions from an active state to an inactive state, and vice versa, according to an embodiment of the invention.

FIG. 5 is an example of a state diagram that illustrates transition states for a circuit component changing from an active state to an inactive state, and vice versa, according to an embodiment of the invention. In this embodiment, a circuit component, such as a functional block or interface circuit, can transition through a wait state when changing from the inactive state to the active state. The circuit component can also transition through a wake-up state when changing from the inactive state to the active state. The inactive state can be any inactive state such as a stalled state or a quiescent state.

The state diagram shows that the circuit component, such as a functional block, can be in an active state with an enabled clock signal at 500. The circuit component can remain in the active state as long as the status of the circuit component is active or not idle. In many embodiments, the circuit component is not idle when the circuit component is processing data, is receiving data, and/or is sending data.

Before completely changing from the active state 500 to an inactive state 520, the state diagram shows that the circuit component can be configured to wait with an enabled clock signal at 510 for a specified period of time defined by an inactive counter. The wait state can be configured so that the clock signal of the circuit component is not disabled during the wait state at 510 to avoid unforeseen idle glitches. For example, an idle state can be erroneously detected when the circuit component is not completely idle.

In this embodiment, when the inactive counter reaches zero, the clock signal to the circuit component is disabled and the circuit component changes from the wait state at 510 to the inactive state at 520. The state diagram shows that if the circuit component returns to an active state (e.g., activity within the circuit component is detected) before the time period expires as determined by the inactive counter, the circuit component can return to the active state at 500.

In some embodiments, the length of the time period that the circuit component remains in the wait state at 510 can be based on the circuit component type or function of the circuit component. Any number of methods can be employed to keep the circuit component in the wait state. In some embodiments, the duration of the inactive counter can be set dynamically. For example, the duration of the inactive counter can be defined based on the type of data or instruction being processed by the circuit component.

The state diagram shows that the circuit component can remain in the inactive state with a disabled clock signal at 520 while the status of the circuit component is inactive. In many embodiments, the circuit component is idle when the circuit component is not processing data, is not receiving valid data, and/or is not sending data.

The state diagram shows that the circuit component can be triggered to transition out of the inactive state at 520 in response to a wake-up indicator. The wake-up indicator can be received from a downstream and/or an upstream unit. The wake-up indicator can be a global wake-up indicator sent to, for example, many circuit components within a processing pipeline. In this embodiment, the circuit component is configured to remain in a wake-up state at 530 for a period of time while the clock signal is being enabled before the circuit component returns entirely to the active state at 500. This period of time can be used to mitigate clock start-up problems due to clock insertion delay (e.g., delay from the root of a clock signal generator to a leaf flip-flop). The circuit component can be configured to wait in the wake-up state at 530 until the period of time, as determined by a wake-up counter, expires. The circuit component can be configured to remain in the wake-up state at 530 to ensure smooth clock signal start-up before, for example, data is captured by the circuit component. For example, the circuit component can be configured to remain in the wake-up state at 530 to ensure that the clock signal is stable before valid data is captured by the circuit component.

In some embodiments, the length of the time period that the circuit component remains in the wake-up state at 510 can be based on the circuit component type or function of the circuit component. Any number of methods can be employed to keep the circuit component in the wake-up state. In some embodiments, the duration of the wake-up counter can be set dynamically. For example, the duration of the wake-up counter can be defined based on the type of data or instruction that will be processed by the circuit component. In some embodiments, the duration of the wake-up counter can be defined to prevent failure associated with specified failure scenarios.

Rather than requiring a circuit component to remain in a wake-up state to delay the enabling of a clock signal, the actual reporting of the change to an active status can be delayed. This technique can be referred to as a status reporting delay. In some embodiments, hardware and/or software modules can be configured to delay clock enabling and/or status reporting to avoid errors associated with, for example, status reporting latencies. For example, a delay can be used to prevent a status reporting error resulting in a clock signal being erroneously disabled as a functional block is changing from an idle state to an active state.

In some embodiments, the circuit component can be configured so that the circuit component can transition directly from the inactive state at 520 to the active state at 500 (transition not shown) in response to, for example, a fast wake-up signal that bypasses the wake-up state at 530. This can be referred to as a fast wake-up. Likewise, the circuit component can be configured so that the circuit component can transition directly from the active state at 500 to the inactive state at 520 (transition not shown) in response to, for example, a fast disable signal that bypasses the wait state at 510.

In some embodiments of the invention, electronic chips and circuit components such as those shown in FIGS. 1 and 3 can be configured so that a clock signal from a clock signal generator can be disabled for a period of time when a circuit component such as a functional block is in a partially active state. A circuit component can be partially active when the circuit component is not completely inactive or active. The clock signal to the circuit component can be disabled, for example, for several clock cycles using a clock gate based on the activity-level of the circuit component to effectively reduce the clock signal frequency. Reducing the number of clock cycles of a clock signal based on the activity-level of the circuit component when the circuit component is partially active can be referred to as clock signal throttling or throttling. The clock cycles during which the clock signal is disabled/blocked can be referred to as inactive clock cycles and the clock cycles during which the clock signal is enabled/unblocked can be referred to as active clock cycles.

Figure 6:
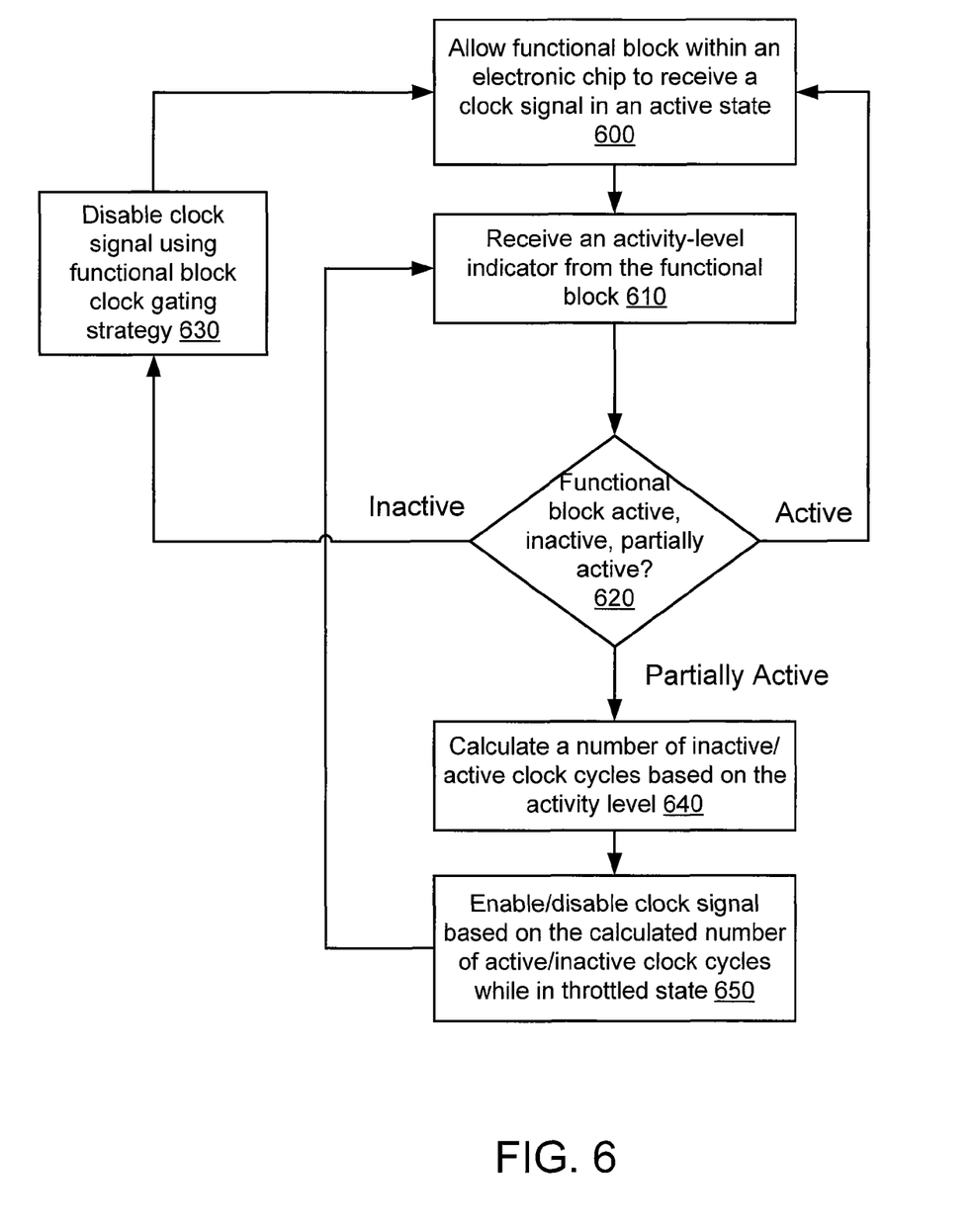
FIG. 6 is a flow chart that illustrates a method for implementing clock signal throttling for a functional block within an electronic chip, according to an embodiment of the invention.

FIG. 6 is a flow chart that illustrates a method for implementing clock signal throttling for a functional block within an electronic chip, according to an embodiment of the invention. The flow chart shows that a functional block within an electronic chip can be allowed to receive a clock signal at 600. The clock signal can be received from a clock signal generator via, for example, a clock gate. The functional block can be any type of circuit component such as a processing unit or portion of a processing unit. This method can also be implemented for a different type of circuit component such as an interface circuit.

An activity-level indicator indicating an activity-level of the functional block can be received at 610. The activity-level indicator can indicate the activity-level of the functional block as, for example, a percentage of processing capability of the functional block being used. The activity-level indicator can also indicate which portions of the functional block are being used. The activity-level indicator can be generated using, for example, a status module associated with the functional block (e.g., integrated into the functional block). More details regarding activity-level measurements and indicators/signals are set forth in co-pending application Ser. No. 11/556,117 filed on Nov. 2, 2006 and entitled, "Power Estimation Based on Block Activity," which is incorporated herein by reference in its entirety.]

After the activity-level indicator is received at 610 the activity-level of the functional block can be analyzed to determine whether the functional block is active, inactive, or partially active at 620. The activity-level indicator can be analyzed using, for example, a status module that receives an ungated clock signal and/or is integrated into the functional block or external to the functional block.

A variety of threshold conditions can be used to determine whether the functional block is active, inactive, or partially active. For example, a set of threshold conditions can be defined such that the functional block can be determined to be partially active when the activity-level (e.g., usage) of the functional block is greater than 0% but less than 80%. The functional block can be regarded as inactive when the activity-level is 0% and active when the activity-level is greater than or equal to 80%.

The threshold conditions can be statically stored in hardware and/or software and can be updated at any time. The threshold conditions can be defined, for example, based on the functional block. For example, a set of threshold conditions for a functional block can be different than the threshold conditions for another functional block. The threshold conditions can be adjusted based on the type of functional block as well. For example, if a functional block is a critical functional block, the functional block can be deemed partially active at a much lower threshold (e.g., 30% usage).

When it is determined that the functional block is in an active state, for example, based on a threshold condition, the functional block continues to receive a clock signal at 600. When it is determined that the functional block is in an inactive state (e.g., idle, stalled), the clock signal can be disabled using a functional block level clock-gating strategy at 630. The functional block level clock-gating strategy can be any combination of the embodiments described in connection with FIGS. 1-5. After the functional block level clock-gating strategy has been implemented, the functional block can continue to receive the clock signal at 600.

When it is determined that the functional block is in a partially active state a clock signal throttling strategy is implemented. Specifically, a number of inactive and/or active clock cycles can be calculated based on the activity-level of the functional block at 640 and the clock signal to the functional block can be enabled/disabled for the calculated active/inactive clock cycles at 650. For example, the clock signal can be disabled for a calculated number of inactive clock cycles and/or enabled for a calculated number of clock cycles during a period of time defined by a specified number of clock cycles of the clock signal. In other words, the inactive and active clock cycles can be interleaved in a time-division multiplexed fashion. An exemplary clock-throttling strategy is described in connection with FIGS. 7A through 7D After the clock signal to the functional block has been disabled for the calculated inactive clock cycles and/or enabled for the calculated active clock cycles at 650, the flow chart shows that an activity-level of the functional block can be received at 610 and used at 620 to determine whether the clock gate throttling should continue to be implemented for the functional block.

Although the flow chart shows that the activity-level indicator can be received in a separate step within the flow chart, in some embodiments, the activity-level of the functional block can, for example, periodically or continuously be received and/or monitored to determine whether the clock signal should be disabled and/or enabled using, for example, the clock gate throttling strategy or some other strategy.

FIGS. 7A through 7D are schematic diagrams that illustrate a clock gate throttling strategy that can be used to calculate inactive/active clock cycles, according to an embodiment of the invention. A clock signal that can be distributed to a functional block can be divided into clock segments with durations determined by predefined (e.g., specified) numbers of clock cycles. The clock signal can be disabled for a number of inactive clock cycles within a clock segment. The clock signal can be enabled for the balance the clock segment. The number of inactive clock cycles can be calculated based on the activity-level of the functional block and/or the duration of the clock segment.

Figure 7A:
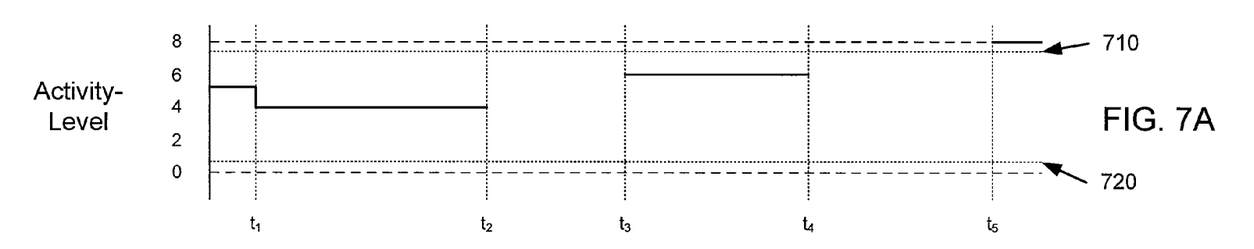
FIG. 7A illustrates an activity-level of a functional block, according to an embodiment of the invention.
Figure 7B:
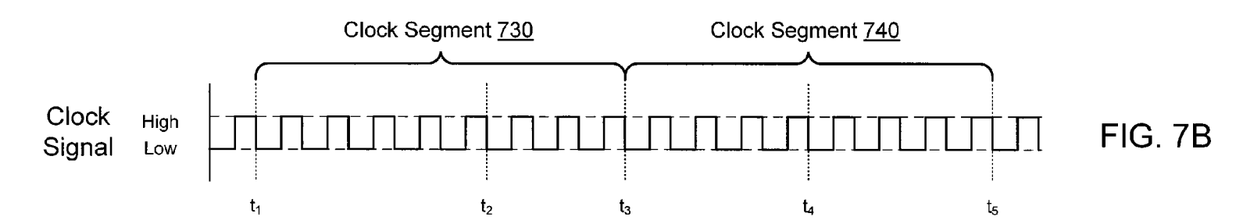
FIG. 7B illustrates a clock signal that can be distributed to a functional block, according to an embodiment of the invention.
Figure 7C:
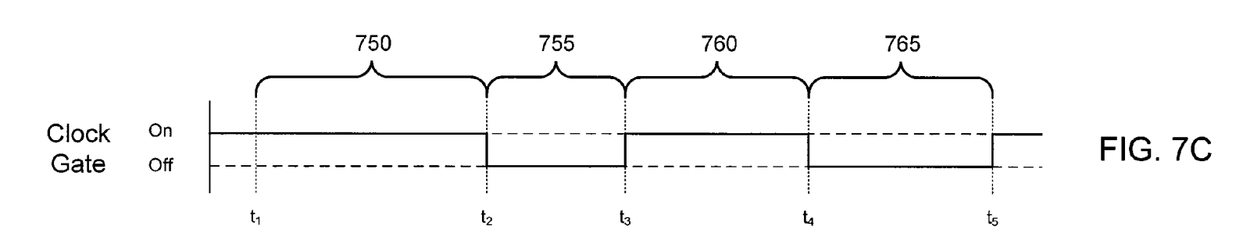
FIG. 7C illustrates the state(s) of a clock gate controlled proportionally based on the activity-level shown in FIG. 7A, according to an embodiment of the invention.
Figure 7D:
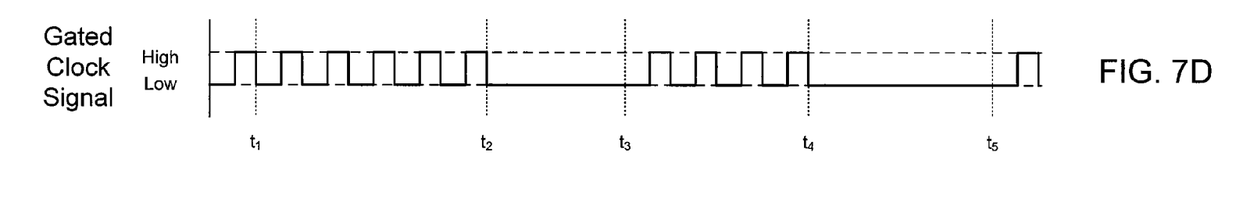
FIG. 7D illustrates a gated clock signal to the functional block resulting from control by the clock gate as shown in FIG. 7C, according to an embodiment of the invention.

FIG. 7A illustrates an activity-level of a functional block and FIG. 7B illustrates a clock signal that can be distributed to the functional block via a clock gate. FIG. 7C illustrates the state(s) of the clock gate controlled proportionally based on the activity-level shown in FIG. 7A. FIG. 7D illustrates a gated clock signal to the functional block resulting from control by the clock gate as shown in FIG. 7C. In all of the figures, time increases from left to right. A person of skill in the art can appreciate that the behavior and timing illustrated in these figures are representative and that the timing can vary depending upon chip design, implementation decisions, etc.

FIG. 7A shows that the activity-level of the functional block can be expressed as a 3-bit quantity (e.g., on a scale of 0 to 8) in this embodiment of the invention. The 3-bit values can be linearly or non-linearly related to the activity-level/usage of the functional block. FIG. 7A shows that the activity-level is at 5 before time $t_1$, at 4 between times $t_1$ and $t_2$, and at or above 6 after time $t_3$. Note that the activity-level of the functional block is not measured when the clock gate is disabling the clock signal to the functional block (shown in FIGS. 7C and 7D).

Also shown in FIG. 7A are the threshold values used for determining whether the functional block is active, partially active, or inactive. When the activity-level of the functional block is between lines 710 and 720, the functional block can be considered partially active and clock gate throttling can be implemented. When the activity-level is above line 710 or below line 720, the functional block can be considered active and inactive, respectively.

Although the activity-level can be expressed as a 3-bit value as shown in FIG. 7A, in some embodiments, the activity-level can be expressed using any scale. For example, the activity-level can be measured and expressed as any length of binary value (e.g., 5-bit value), signal, etc. In some embodiments, the activity-level can be expressed and used as a percentage of usage of the functional block or as a percentage of the functional block that is inactive. In some embodiments, the activity-level of the functional block can be measured continuously, at specified intervals, and/or at random intervals.

FIG. 7B illustrates a clock signal that can be distributed to the functional block via a clock gate (i.e., ungated clock signal before the clock gate). The clock signal in FIG. 7B is divided into clock segments 730 and 740 that are each 8 cycles in duration. Clock segment 730 starts at time $t_1$ and ends at time $t_3$ and clock segment 740 starts at time $t_3$ and ends at time $t_5$. Although this figure only shows two clock segments, the clock signal can continuously be allocated into clock segments.

Although the length of a clock segment shown in FIG. 7B is 8 cycles, in some embodiments, the length of a clock segment can be a different specified duration. For example, the length of the clock segment can be increased (e.g., 16 block cycles) or decreased (e.g., 3 clock cycles). The duration of a clock segment (e.g., specified number of clock cycles within the clock segment) can be determined based on the type of functional block that is using the clock gate throttling strategy. In some embodiments, the length of a clock segment can be variable in length and/or can be dynamically defined. For example, the duration of a set of clock segments can be defined based on an average activity-level of a functional block over a specified period of time.

FIG. 7C illustrates the state(s) of the clock gate controlled proportionally based on the activity-level shown in FIG. 7A. During the clock segment 730 the clock gate is on during time period 750 (between times $t_1$ and $t_2$) and off during time period 755 (between times $t_2$ and $t_3$). During the clock segment 740 the clock gate is on during time period 760 (between times $t_3$ and $t_4$) and off during time period 765 (between times $t_4$ and $t_5$).

The time periods 750 and 760 during which the clock gate is on and the time periods 755 and 765 during which the clock gate is off are directly derived/calculated from the activity-level values shown in FIG. 7A. The clock gate is on for 5 cycles (and off for 3 inactive cycles) during the clock segment 730 because the activity level before the clock segment 730 (starting at time $t_1$) was at 5. Likewise, the clock gate is on for 4 cycles (and off for 4 inactive cycles) during clock segment 740 because the activity-level just the clock segment 740 (starting at time $t_3$) was at 4.

In some embodiments, the number of inactive and/or active clock cycles can be calculated based on a variety of mathematical relationships between, for example, a measured activity-level(s) and a clock segment duration. The number of active clock cycles for a given clock segment can be, for example, two or four times the value of the activity-level of the functional block. In some embodiments, the number of inactive and/or active clock cycles can be calculated based on a non-linear relationship between the activity-level and the duration of a clock segment.

In some embodiments, a clock signal can be disabled for a specified number of clock cycles when the activity-level of the functional block falls below a specified threshold value. For example, a threshold condition can be defined such that the clock signal to a functional block can be disabled for half of the clock cycles in a clock segment when the activity-level of the functional block falls below 70% usage.

In some embodiments, the number of inactive clock cycles can be maintained at half of the clock cycles in a clock segment even if the activity level of the functional block falls well below the 50% usage (e.g., 0% usage). In other words, the number of inactive clock cycles can be limited so that clock signal will be enabled for at least a certain number of clock cycles during each clock segment. This limit can be referred to as an inactive clock cycle threshold value.

FIG. 7D illustrates a gated portion of the clock signal (shown in FIG. 7B) to the functional block resulting from the clock gate control shown in FIG. 7C. FIG. 7D shows that the gated clock signal corresponds directly with the state of the clock gate in FIG. 7C. The gated clock signal to the functional block is enabled between times $t_1$ and $t_2$ and between times $t_3$ and $t_4$. The gated clock signal to the functional block is disabled between times $t_2$ and $t_3$ and between times $t_4$ and $t_5$.

Although in this embodiment, the clock signal was disabled for the inactive clock cycles at the end of the clock segments, in some embodiments, the clock signal can be disabled at any time during the clock segments. In some embodiments for example, the inactive clock cycles can be spread out over the clock segments. Also, in some embodiments, the activity-level of the functional block can then be measured in pulses at any time during a clock segment.

In some embodiments, a clock signal can be throttled as soon as active/inactive clock cycles are calculated based on an activity-level measurement so that the clock gate throttling can be implemented in substantially real-time with the measurement of the activity-level. In some embodiments, an activity-level can be measured and used to calculate active/inactive clock cycles at specified intervals. For example, an activity-level can be measured and active/inactive clock cycles can be calculated just before the start of a clock segment in which they are used.

In some embodiments, the clock gate throttling strategy can be based on not only the activity-level of a functional block, but also on the activity-level of adjacent circuit components. The inactive clock cycles during a clock segment for a functional block can be calculated based on the activity-level of data-flow to and/or from the functional block. For example, the number of inactive clock cycles during a particular clock segment of a clock signal can be determined based not only the activity-level of a functional block, but also based on the activity-level of an adjacent functional block in a pipeline with the functional block (e.g., data-flow between functional blocks). The algorithm used to calculated the number of inactive clock cycles can be a complex mathematical relationship that includes variables and constants related to measured activity-level measurements and/or clock segments.

Figure 8:
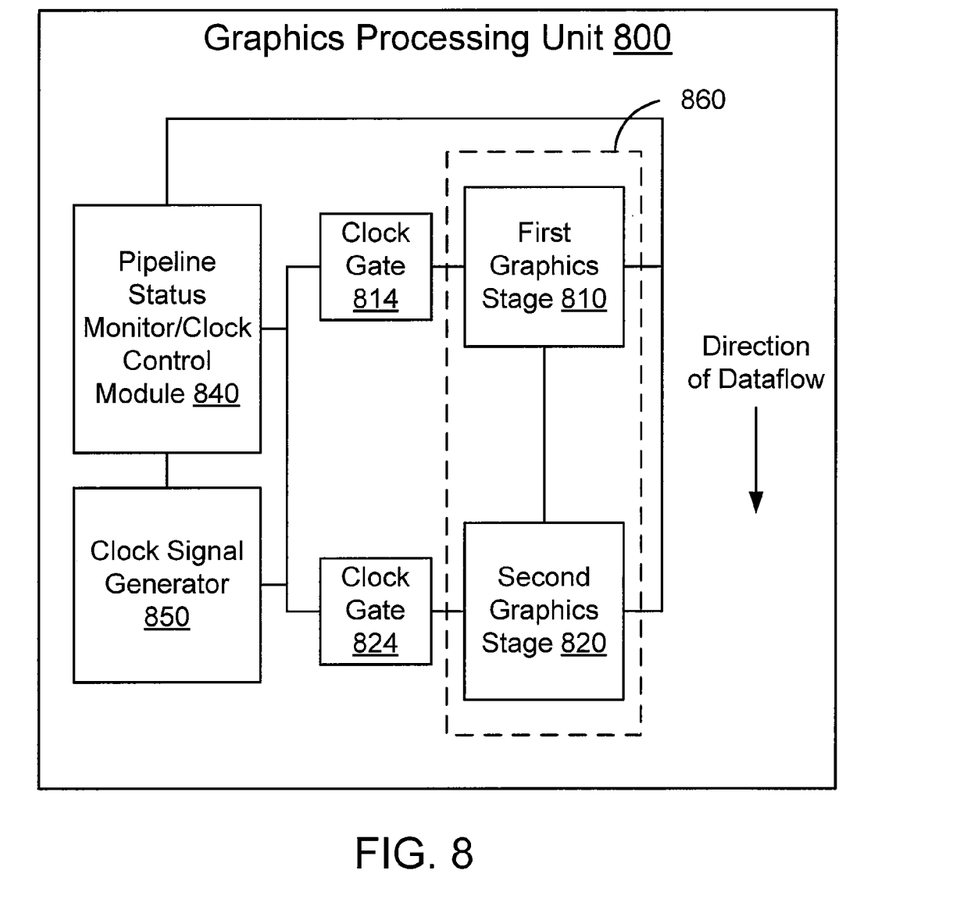
FIG. 8 is a schematic diagram of a graphics pipeline of a graphics processing unit configured to implement a functional block level clock-gating strategy, according to an embodiment of the invention.

Referring now to FIG. 8, it illustrates an implementation of functional block level clock-gating in a graphics processing pipeline 860 of a graphics processing unit 800. The graphics processing unit 800 in this embodiment includes two graphics stages—a first graphics stage 810 and a second graphics stage 820. The graphics stages define the graphics processing pipeline 860 (also referred to as a graphics pipeline) with data flowing through the graphics pipeline 860 in a downward direction as shown in FIG. 8. During operation of the graphics pipeline 860, the first graphics stage 810 performs a set of graphics processing operations on input data then issues the results for further processing by the second graphics pipeline stage 820. The first graphics stage 810 and the second graphics stage 820 are configured to process data and synchronize the flow of data through the graphics pipeline 860 based on a clock signal from a clock signal generator 850 received via clock gates 814 and 824.

While only two graphics processing stages (e.g., modules) are illustrated in FIG. 8, it is contemplated that the graphics pipeline 860, in some embodiments, can include more or less graphics processing stages depending on the particular implementation so long as the stages are properly ordered in a pipeline configuration (e.g., sequential processing). As an example, an individual graphics stage (or additional graphics stage) can be configured to, for example, calculate primitives (e.g., points, lines, triangles), perform shading (e.g., vertex, geometry, pixel), apply textures or texture filters, perform raster operations, perform frame buffering, perform tessellation, etc. It is also contemplated that these graphics processing stages can be combined, sub-divided, or reordered for another implementation and can have different processing requirements with respect to, for example, vertex attributes. The graphics stages can be configured to receive data (on an input) from multiple upstream graphics stages and/or send data (through an output) to multiple downstream graphics stages.

The graphics processing unit 800 includes a pipeline status monitor/clock control module 840 (also referred to as a pipeline module) that is configured to determine the status of data-flow within the graphics pipeline 860 by monitoring, detecting, and/or determining the status of one or more of the graphics stages. The pipeline module 840 is configured to independently control, based on the status (e.g., data-flow), the clock signal to at least a portion of the first graphics stage 810 and at least a portion of the second graphics stage 820 using the clock gates 814 and 824, respectively. The functional block level clock-gating strategy triggers automatic staggering of the clock signal the first graphics stage 810 and the second graphics stage 820 as they individually change from an active status to an inactive status (e.g., idle), and vice versa, as data flows through the graphics pipeline 860.

By turning-off the clock to only portions of the graphics pipeline 300 (e.g., a single stage) that are not processing graphics related information using the functional block level clock-gating strategy, the performance of the graphics processing unit 800 will be substantially unaffected. Only the portions of the graphics processing pipeline 860 that are actively processing data will be enabled for processing. In other words, graphics stages or portions of graphics stages are turned-off for selected numbers of clock cycles as idle time periods flow through the graphics pipeline 860. This is contrasted with a zone-based power savings strategy that could require shutting down large portions of the graphics processing unit 800 for a period of time (e.g., milliseconds), thereby preventing processing through the graphics pipeline 800 during the period of time.

The disabling/enabling of the clock signal using the clock gates 814 and/or 824 can be triggered when a threshold condition based on a status or activity-level measurement (e.g., percentage usage value) of one or more of the graphics stages 810 and/or 820 is satisfied as determined by, for example, the pipeline module 840. Also, in some embodiments, the clock signal to the graphics stages within the pipeline 860 can be controlled based on a variety of states (e.g., stalled state, quiescent state, etc) rather than based on only an active or inactive state. For example, a set of threshold conditions can be defined such that the functional block can be determined to be partially active when the activity-level (e.g., usage) of the graphics stage is greater than 0% but less than 80%. The graphics stage can be regarded as inactive when the activity-level is 0% and active when the activity-level is greater than or equal to 80%. The threshold conditions can be statically stored in hardware and/or software and can be updated at any time.

Although not shown, the graphics pipeline 860 can also be configured to include interface circuits to facilitate the transporting of data between graphics stages and/or other interface circuits (not shown) within the graphics pipeline 860. The graphics processing unit 800 can also include one or more local memories (not shown) connected to the graphics pipeline 860 and configured to act as, for example, a frame buffer that is implemented using a RAM (e.g., DRAM).

The pipeline module 840 shown in FIG. 8 can be configured to include various functional block level clock-gating functionality that can be separated into one or more hardware and/or software modules that can be distributed and/or associated with any portion of the graphics pipeline 860. For example, the pipeline module 840 can be configured in some functional block level clock-gating strategies to filter out status reporting glitches (e.g., an inaccurate or incomplete status report), stall interface circuits when the clock signal is disabled or being enabled, trigger the enabling of clock signal based on a wake-up event, and/or trigger the enabling of a clock signal immediately (e.g., next clock pulse) for non-stallable interfaces for one or more portions of the graphics pipeline 860. For example, before completely changing a graphics stage (e.g., first graphics stage 810) from an active state to an inactive state, the graphics stage can be configured to wait with an enabled clock signal for a specified period of time as defined by an inactive counter. The wait state can be configured so that the clock signal of the graphics stage is not disabled during the wait state, for example, to avoid unforeseen idle glitches.

When enabling a clock signal to a graphics stage within the graphics pipeline 860, in some embodiments, the pipeline module 840, for example, can be configured to immediately enable or delay the enabling of the clock signal and/or delay data processing until the clock signal is stable (e.g., using clock signal insertion delay and status reporting latency). In some embodiments, hardware and/or software modules, for example, in a pipeline module 840 can be configured to delay the enabling of a clock signal to a graphics stage to allow sequencing of multiple clocks distributed across a chip to reduce large chip-wide current changes over period of short periods of time (di/dt) when multiple clock signals are simultaneously triggered by, for example, a host processor.

For example, a graphics stage can be triggered to transition out of an inactive state in response to a wake-up indicator (e.g., pulsed wake-up) received from a downstream and/or an upstream graphics stage. In some embodiments, the graphics stage can remain in a wake-up state for a period of time to delay the enabling of a clock signal (e.g., by delaying the actual reporting of the change to an active status). In some embodiments, hardware and/or software modules can be configured to delay clock enabling and/or status reporting to avoid errors associated with, for example, status reporting latencies. For example, a delay can be used to prevent a status reporting error resulting in a clock signal being erroneously disabled as a functional block is changing from an idle state to an active state.

In some graphics processing unit 800 embodiments, the hardware and/or software used to implement a functional block level clock-gating strategy (e.g., pipeline module 840) can be configured to reduce the effective clock frequency to a graphics stage by suppressing clock signal pulses (e.g., for a few clock signal pulses from a group of clock signal pulses) based on a clock signal throttling strategy. In some clock throttling scenarios, the hardware activity-level of the graphics stage is in a semi-active or partially active state where only a fraction of the processing capability of the graphics stage is being used.

In conclusion, the present invention provides, among other things, apparatus and methods related to functional block level clock-gating. Those skilled in the art can readily recognize that numerous variations and substitutions may be made in the invention, its use and its configuration to achieve substantially the same results as achieved by the embodiments described herein. Accordingly, there is no intention to limit the invention to the disclosed exemplary forms. Many variations, modifications and alternative constructions fall within the scope and spirit of the disclosed invention as expressed in the claims.

What is claimed is:

1. A method, comprising:

receiving an indicator of an activity-level of each of a plurality of graphics processing stages within a graphics processor indicative of a data flow, the graphics processing stages being included in a graphics processing pipeline, each graphics processing stage from the plurality being configured to receive a clock signal from a clock signal generator;

determining a status of each of the plurality of graphics processing stages based on the indicator of the activity-level;

disabling the clock signal to at least a portion of a particular graphics processing stage when the status indicates that the particular graphics processing stage is an inactive status and disabling said at least a portion of the particular graphics processing stage for at least one clock cycle saves power without significantly affecting processing performance of the graphics processing pipeline;

determining the status of the graphics processing stage during a pulse wake-up time period in response to a wake-up signal; and sending an indicator of the status to at least one of an upstream circuit component within the graphics processing pipeline or a downstream component within the graphics processing pipeline.

* * * * *